Jan. 29, 1952 W. G. WILSON 2,583,919
FLUID PRESSURE ACTUATED CLUTCH

Filed March 18, 1946 2 SHEETS—SHEET 1

Inventor
W. G. Wilson
By Glascock Downing &c
Attys.

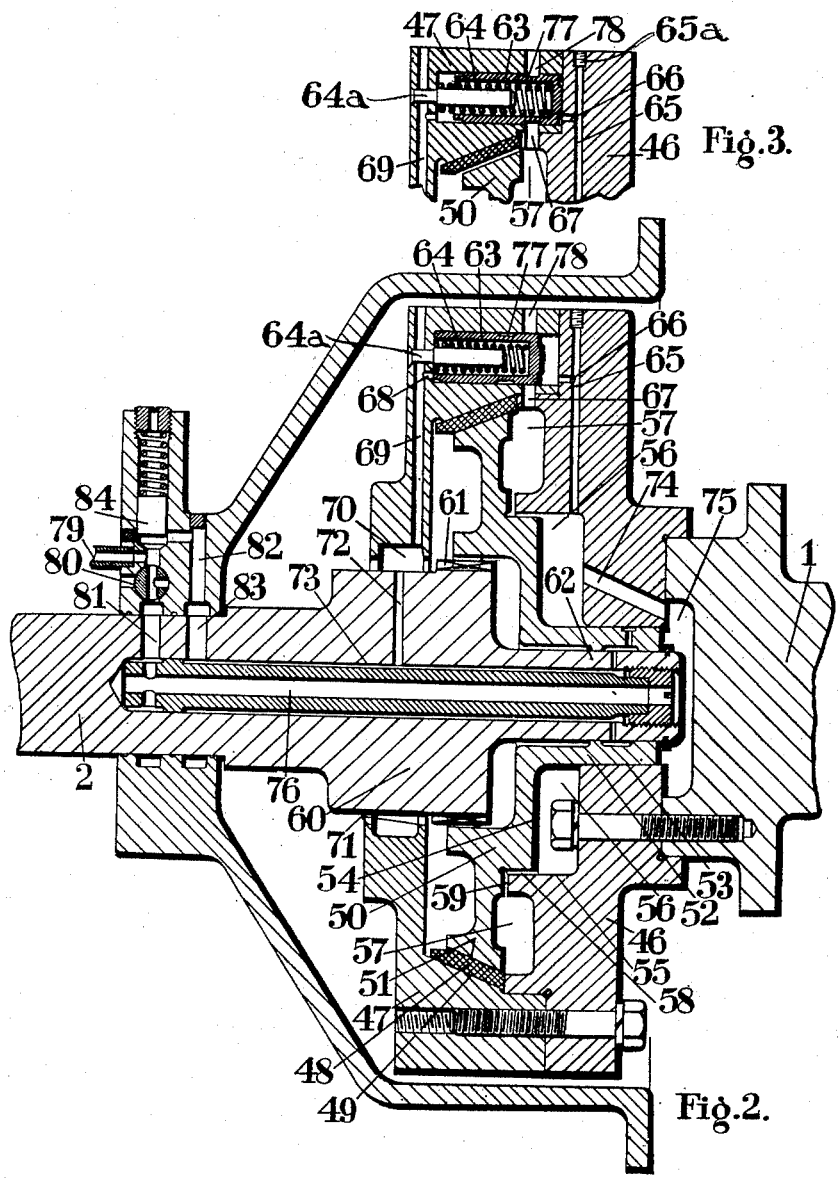

UNITED STATES PATENT OFFICE 2,583,919

FLUID PRESSURE ACTUATED CLUTCH

Walter Gordon Wilson, Martyr Worthy, near Winchester, England

Application March 18, 1946, Serial No. 655,279
In Great Britain March 30, 1945

4 Claims. (Cl. 192—85)

This invention relates to hydraulic mechanisms such as hydraulic clutches of the type wherein valve control or valve relay means are provided for controlling the flow of the operating fluid such that actuation of the clutch or other mechanism cannot be effected until the pressure of the fluid attains a predetermined amount sufficient to actuate the relay valve and move it to a position which allows the operative fluid to act upon the clutch or other hydraulic mechanism.

In hydraulic clutches or other hydraulic mechanism having the features above set out owing to the rotary motion of the mechanism centrifugal action is set up and imparts to the actuating fluid a force which varies with the speed of rotation and such acting upon the relay valve causes its action to be unreliable so that the operation of the clutch does not necessarily become operable in accordance with the predetermined pressure at which the relay valve should function.

An object of the invention is to provide improved control or relay valve means adapted to become operative at a predetermined pressure of the operative fluid irrespective of the action of centrifugal force on such fluid.

According to the invention in hydraulic clutch or other hydraulic mechanism having relay valve means controlling the flow of operative fluid, means are provided adapted to form a fluid reservoir under a head opposed in action to the head of the operating fluid acting on the valve during an operative period, whereby substantially equal and opposite forces set up by centrifugal action on the operative fluid and the fluid reservoir act upon the valve during the operative period.

The valve is preferably arranged with its axis parallel to the axis of revolution of the clutch or other mechanism so that the force set up in the valve body by centrifugal action on its mass does not affect its action.

In the accompanying drawings:

Figure 2 is a sectional elevation showing the invention applied to a cone clutch with the parts in the "on" position.

Figure 3 is a sectional elevation showing the relay valve in the "off" position.

Figure 1:
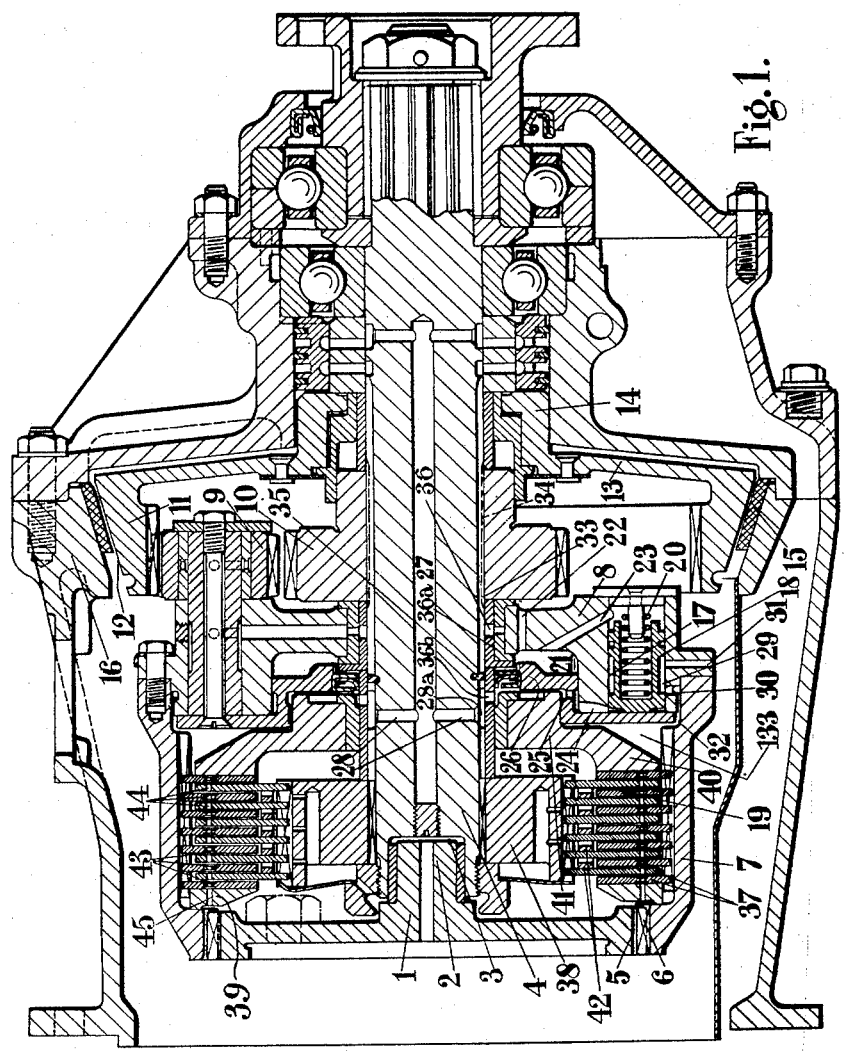
Figure 1 is a sectional elevation of the running gear of a marine gear box showing the invention as applied to a plate clutch.

In carrying the invention into effect as applied by way of example to the running gear of a marine gear box, see Figure 1, the input element 1 comprises a disc having a central spigot or projection 2 which enters an axial hole 3 in the output element or shaft 4. The periphery of the input disc is provided with dog teeth 5 engaging complementary teeth 6 in a shell member 7 which is secured to a cage element 8 which carries a number of planet gears 9 which mesh by intermediate gears with a sun gear 10 splined to the output shaft 4 and directly with an annulus 11 which is provided with a coned surface 12. The annulus 11 is formed upon a disc 13 having a concentric piston element 14 whereby the annulus may be moved axially to bring its coned surface 12 into engagement with a complementary coned braking element 15 mounted upon a stationary casing 16 enclosing the mechanism.

In the planet cage 8 and conveniently diametrically opposite one of the gears 9 is a bore 17 forming a chamber for a relay valve 18. The axis of the bore lies parallel with the axis of rotation of the output shaft. The valve 18 is of the piston type and is adapted to control the flow of the pressure fluid to a clutch 19 arranged between the input and output elements 1 and 4 to be described hereinafter.

The relay valve 18 is spring controlled by a coil spring 20 which normally holds the valve in its non-operative position when the clutch is open, as shown.

Located within the planet cage 8 and between the valve 18 and the axis of the output shaft 4 is a chamber or reservoir 21 which is adapted to be constantly filled to a predetermined head by oil which is conveniently supplied by the lubricating system. In order to determine the head of the oil in this reservoir there is a duct or outlet 22 comprising an aperture through the wall of the cage lying parallel with the axis of the shaft. This aperture 22 connects the chamber 21 to the low pressure side or atmosphere so that any excess of oil seeping to the chamber will escape freely.

A conduit 23 is provided leading from the reservoir chamber 21 to the valve chamber 17 so that the oil will flow into the valve chamber on the same side of the valve as the spring 20, that is, the side remote from the operative fluid pressure.

A duct 24 opens into the valve chamber at the opposite end to the conduit 23 to allow pressure fluid to act upon the valve 18 in opposition to the spring. Such fluid is by-passed through an opening 25 from the operating cylinder 26 of the clutch. The cylinder 26 receives oil under pressure from suitable pump means through an axial duct 27 and radial passages 28 in the output shaft 4. From the radial passages 28 the oil flows to the annular space 28a and through holes 36b in the bush 36a.

When the clutch 19 is to be operated it will be appreciated that the pressure fluid passing through duct 24 and acting on the relay valve 18 will move the valve axially against the spring 20 when the pressure of the fluid is sufficient to overcome the spring. In addition to the pressure set up by the pump there will be an increment owing to the action of centrifugal force. Such increment will however be neutralised by the action of centrifugal force on the oil in the reservoir 21 acting upon the opposite face of the valve 18, so that the valve will operate as determined by the force of the valve spring 20.

The valve 18 is provided with an annular groove 29 controlling a pair of ports 30, 31 in the wall of the chamber 17. One of the ports 31 leads to atmosphere or the low pressure side and the other 30 is connected by suitable passages or clearances 32 with the oil in the clutch chamber 133 so that oil from the chamber may pass to the low pressure side when the valve 18 is in the position shown in Figure 1.

The oil of the lubricating system which supplies the reservoir 21 flows along splines 33 in the output shaft and at the position where the sun pinion 10 engages such splines, the splines are partially cut away at 34 to permit the flow of oil. Adjacent the reservoir a seal 35 is provided in the splines and a passage 36 leads from the splines to the bush 36a whence oil escapes via the running clearances around the bush into reservoir 21.

The clutch means comprises a series of plates or discs 37, alternate plates being splined to the shell 7 and to an inner disc 38 which in turn is splined to the adjacent end of the output shaft 4. The outer plates of the series splined to the shell 7 are located between an abutment ring 39 and a disc 40 which is associated with or forms part of the piston element 41 by which the plates are moved axially with preliminary contacting engagement, the piston 41 being operated by the pressure fluid passing along the axial bore 27 and radial passages 28 in the output shaft and annular space 28a and passages 36b as referred to above.

In order to spread or open the plates when the clutch is out corrugated or sinuous spring plate elements 42 are located between the inner set of clutch plates splined to the disc 38. Similar spring elements 42 may be provided between the outer clutch plates, additionally or alternatively.

The clutch plates may be of the construction according to my concurrent application Serial No. 655,280, filed March 18, 1946. Thus adjacent their outer peripheries where the clutch plates 37 still overlap one another the surfaces of the outer series of clutch plates are provided with annular grooves 43 and coinciding therewith a circumferential series of apertures 44 are provided in both sets of plates. Apertures 45 are also provided in the abutment 39. By the provision of these grooves 43 and apertures 44 and 45 any oil that percolates between the plates 37 from the outer peripheries owing to irregularities in the surfaces of the plates is allowed to escape and thus an opposing pressure is avoided. The grooves and apertures will also collect and disperse any oil that may percolate between the plates from their inner margins under the action of centrifugal force.

It will be appreciated that the grooves 43 may be provided on both sets of plates, or alternatively on the inner set.

Figures 2 and 3 show a modification in which the invention is applied to a hydraulically actuated cone clutch. The input shaft 1 has secured thereon a pair of apertured discs 46 and 47 which are bolted together adjacent their peripheries. The disc 46 is spigoted into the disc 47 and the latter is provided with an internally coned clutch surface 48 having a friction lining 49. Co-operating with the coned surface 48 is a disc 50 having a coned periphery 51. The disc 50 is provided with a sleeve 52 entering the aperture 53 in the disc 46 with a sliding fit. The disc 50 is also provided with an annular portion 54 which enters a recess 55 in the disc 46 with a slight clearance 58 at its periphery. The space between the annulus 54 and the base of the recess 55 forms a primary chamber 56 for the pressure fluid by which the clutch member or disc 50 is moved axially. The angle of the conical surfaces 48 and 51 is such that they become free on release of the clutch applying pressure of the operative fluid.

A second chamber 57 is formed outwardly of the chamber 56 by an annular recess in the disc 46. This chamber 57 forms a secondary chamber for the pressure fluid and communicates with the primary chamber 56 by the clearance 58 and a radial space 59 between the discs 46 and 50.

The output shaft 2 has a boss 60 formed thereon which is provided with teeth or splines 61 meshing with teeth or splines on the movable clutch disc 50. The shaft 2 is also provided with a reduced end or spigot 62 extending through an axial aperture in the sleeve 52.

The relay valve 63 is located in a bore in the disc 47 adjacent its periphery and is provided with a spring 64 acting in opposition to the pressure fluid which communicates with the valve bore by a passage 65 from the primary pressure chamber 56 and a duct 66. The valve bore is also intersected by a passage 67 from the secondary pressure chamber 57, such passage leading to the low pressure side under control of the valve.

The valve bore at its other end communicates by a duct 68 and passage 69 with a reservoir 70 formed in the peripheral wall surrounding the aperture in the disc 47. The reservoir 70 is adapted to receive oil from the lubrication system. The depth of oil in the reservoir remains constant as any excess oil flows freely over the lips 71 to the low pressure side.

The passage 65 is closed at its outer end by a screwed plug 65a. The passage 69 is closed beyond the passage 68 by the pin 64a which guides the spring 64.

Oil is delivered to the reservoir by a duct 72 in the boss 60 which is connected by an annular passage 73 extending through the output shaft 2 and communicating with a supply.

Pressure fluid flows to the primary chamber 56 by way of the duct 74, dishing 75 in the end of the input shaft and an axial bore 76 in the output shaft.

The valve 63 is provided with an annular recess 77 adapted when the clutch is in the "off" position (see Figure 3) to allow oil in the chamber 57 to pass through the passage 67 and passage 78 to the low pressure side.

When the clutch is to be put "on" oil flowing into the primary chamber 5 passes along the passages 65, 66 and acts on the valve 63 against the action of 64. If the pressure of the oil is sufficient to overcome the spring 64 the valve will move to close the outlet 67, 78 to the low pressure side. Pressure will thus be built up in the chamber 56 to move the clutch disc 50 into clutching engagement with clutch cones 48, 49.

Centrifugal force on the pressure fluid acting on the valve is balanced by centrifugal force on the oil in the reservoir 70, acting through passage 69 on the opposite end of the valve.

The pressure fluid is supplied from a pump through the conduit 79 under control of a valve 80 and passes through a radial passage 81 to the bore 76. The lubricating oil is by-passed from the conduit 79 through passages 82, 83 to the annular passage 73 under control of a pressure regulator 84.

The valve 80 is arranged to shut off the supply of oil from conduit 79 when moved to the "off" position and at the same time to release to atmosphere, or to the low pressure side, any pressure remaining in passages 81 and 76 so that the relay valve moves under the action of spring 64 to the "off" position and allows the oil to escape from chamber 57 through passages 67 and 78 to the low pressure side.

It is to be noted that the improved relay valve arrangement may be used with any form of hydraulic clutch or other appropriate hydraulic mechanism in which centrifugal force produces a variation of the pressure of the operating fluid.

I claim:

1. In an arrangement of the character described, a clutch mechanism, a cylinder, a pressure fluid actuated piston in the cylinder for operating the clutch mechanism, means to supply an operating fluid under pressure to said piston, valve relay means for controlling the flow of the operating fluid to said piston such that actuation of the clutch mechanism cannot be effected until the pressure of the operating fluid attains a predetermined amount sufficient to actuate the relay valve means to move it to a position which allows the operating fluid to act upon said piston, means defining a chamber, further means to supply fluid to said chamber, which fluid forms a fluid reservoir having a constant head, means defining a fluid connection transverse to the axis of rotation between said chamber and the relay valve means so that the fluid in said chamber acts upon said valve in opposition to the operating fluid during an operative period, whereby substantially equal and opposite forces set up by centrifugal action on the operating fluid and the fluid in said chamber act upon the valve relay means during the operative period.

2. Hydraulic clutch mechanism as claimed in claim 1, wherein the valve relay means comprises a reciprocating valve mounted with its axis of reciprocation parallel to the axis of revolution of the clutch mechanism.

3. Hydraulic clutch mechanism as claimed in claim 1, wherein the valve relay means comprises a reciprocating valve mounted with its axis of reciprocation parallel to the axis of revolution of the clutch mechanism, a lubricating system for conveying lubricating oil to the operative parts of the clutch mechanism, said chamber comprising an annular cavity in a rotary part of the clutch mechanism, a passage for conveying lubricating oil from said system to said cavity to provide the fluid reservoir, and an overflow passage from the cavity whereby a constant head of oil is maintained in the chamber.

4. Hydraulic clutch mechanism comprising input and output elements, intermeshing clutch plates connected alternately to the input and output elements, a cylinder, a pressure fluid actuated piston in the cylinder for moving said plates to their clutching position, means for supplying an operating fluid under pressure to said piston, a reciprocating relay valve for controlling the flow of pressure fluid to said piston whereby the actuation of the clutch mechanism cannot be effected until the pressure of the operating fluid attains a predetermined amount sufficient to actuate the relay valve, said valve being arranged with its axis parallel to the axis of revolution of the clutch, means defining an annular cavity in a rotary part of the clutch mechanism forming a chamber, means to supply fluid to said chamber to form a fluid reservoir having a constant head, means defining a fluid path transverse to the axis of rotation between said chamber and the relay valve so that fluid in said chamber acts upon said valve in opposition to the operating fluid during an operating period, whereby substantially equal and opposite forces set up by centrifugal action on said operating fluid and the fluid in said chamber act upon the valve during the operating period.

WALTER GORDON WILSON.

REFERENCES CITED

The following references are of record in the file of this patent:

UNITED STATES PATENTS

| Number | Name | Date |
| --- | --- | --- |
| 1,380,823 | Matthews et al. | June 7, 1921 |
| 1,938,914 | Kress | Dec. 12, 1933 |
| 2,163,202 | Kegresse | June 20, 1939 |
| 2,178,017 | Fedden et al. | Oct. 31, 1939 |
| 2,217,357 | Coe | Oct. 8, 1940 |
| 2,245,857 | Hale | June 17, 1941 |
| 2,399,853 | Chilton | May 7, 1946 |